(12) United States Patent
Goto et al.

(10) Patent No.: US 9,000,956 B2
(45) Date of Patent: Apr. 7, 2015

(54) PORTABLE TERMINAL AND INPUT CONTROL METHOD

(75) Inventors: Masayuki Goto, Osaka (JP); Makoto Hosoi, Kawasaki (JP); Hidekazu Ito, Kawasaki (JP); Shigefumi Yamada, Kawasaki (JP); Yoshihiro Takamatsuya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 214 days.

(21) Appl. No.: 13/091,225

(22) Filed: Apr. 21, 2011

(65) Prior Publication Data

US 2011/0193727 A1      Aug. 11, 2011

Related U.S. Application Data

(63) Continuation of application No. PCT/JP2008/069570, filed on Oct. 28, 2008.

(51) Int. Cl.
*H03K 17/94* (2006.01)
*G06K 9/00* (2006.01)
*G06F 3/0354* (2013.01)
*G06F 3/038* (2013.01)

(52) U.S. Cl.
CPC ........ *G06K 9/00375* (2013.01); *G06F 3/03547* (2013.01); *G06F 3/038* (2013.01); *G06F 2203/0338* (2013.01)

(58) Field of Classification Search
CPC ....................................... H03K 17/94
USPC .......................... 341/20, 21, 22, 23
See application file for complete search history.

(56) References Cited

U.S. PATENT DOCUMENTS

| | | | | |
|---|---|---|---|---|
| 5,852,670 A * | 12/1998 | Setlak et al. | ................... | 382/126 |
| 5,880,411 A * | 3/1999 | Gillespie et al. | ........... | 178/18.01 |
| 7,760,920 B2 * | 7/2010 | Abiko | ............................ | 382/124 |
| 7,956,850 B2 | 6/2011 | Moon et al. | | |
| 2004/0085188 A1 * | 5/2004 | Minemura | ................... | 340/5.53 |
| 2006/0007182 A1 | 1/2006 | Sato et al. | | |
| 2006/0067566 A1 * | 3/2006 | Hara | ............................. | 382/124 |

(Continued)

FOREIGN PATENT DOCUMENTS

| | | |
|---|---|---|
| CN | 1185844 A | 6/1998 |
| CN | 1357810 | 7/2002 |

(Continued)

OTHER PUBLICATIONS

International Search Report dated Dec. 9, 2008, from corresponding International Application No. PCT/JP2008/069570.

(Continued)

*Primary Examiner* — Amine Benlagsir
(74) *Attorney, Agent, or Firm* — Katten Muchin Rosenman LLP

(57) ABSTRACT

A portable terminal includes a finger sensor that recognizes, in response to contact of a finger, the contact and a movement of the finger; and a conversion unit that converts the movement of the finger recognized by the finger sensor into an input event corresponding to an operation instruction to an application running on the portable terminal. If a period of time from recognition of release of the finger from the finger sensor to recognition of placement of the finger on the finger sensor is less than a predetermined amount of time corresponding to physical limitations of a human, the conversion unit does not convert to the input event the recognition of placement of the finger, and recognition of a movement of the finger until recognition of release of the finger after the recognition of placement of the finger.

12 Claims, 13 Drawing Sheets

(56) References Cited

U.S. PATENT DOCUMENTS

| | | | |
|---|---|---|---|
| 2006/0078176 A1* | 4/2006 | Abiko et al. | 382/124 |
| 2006/0285729 A1* | 12/2006 | Kim et al. | 382/124 |
| 2007/0056582 A1* | 3/2007 | Wood et al. | 128/200.24 |
| 2007/0064927 A1 | 3/2007 | Kusunoki et al. | |
| 2007/0120828 A1* | 5/2007 | Fyke | 345/169 |
| 2007/0266273 A1 | 11/2007 | Adachi et al. | |
| 2008/0041640 A1 | 2/2008 | Gillespie et al. | |
| 2008/0100477 A1* | 5/2008 | Laufkotter | 341/23 |
| 2008/0204422 A1 | 8/2008 | Moon et al. | |
| 2009/0003664 A1* | 1/2009 | Setlak et al. | 382/124 |
| 2009/0169070 A1* | 7/2009 | Fadell | 382/124 |

FOREIGN PATENT DOCUMENTS

| | | |
|---|---|---|
| CN | 1882903 | 12/2006 |
| CN | 101194172 | 6/2008 |
| EP | 1 531 419 | 5/2005 |
| JP | 2001-265507 | 9/2001 |
| JP | 2005-149531 | 6/2005 |
| JP | 2005-190127 | 7/2005 |

OTHER PUBLICATIONS

Chinese First Office Action dated Mar. 12, 2013, from corresponding Chinese Application No. 200880131721.9.

Chinese Office Action dated Jul. 31, 2014, from the corresponding Chinese Application No. 200880131721.9.

Supplementary European Search Report dated Jan. 14, 2014, from corresponding European Application No. 08877709.9-1959.

Alex Olwal et al. "Rubbing and Tapping Precise and Rapid Selection on Touch-Screen Displays" The 26th Annual CHI Conference on Human Factors in Computing Systems, Apr. 5, 2008, pp. 295-304.

\* cited by examiner

FIG.1
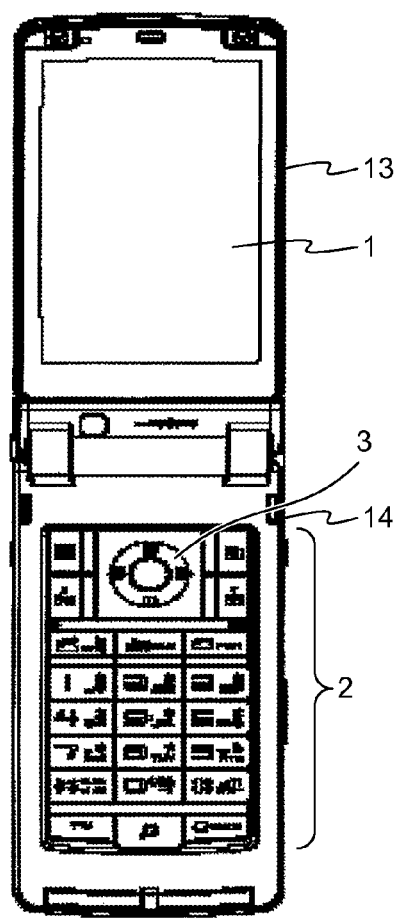
(A)
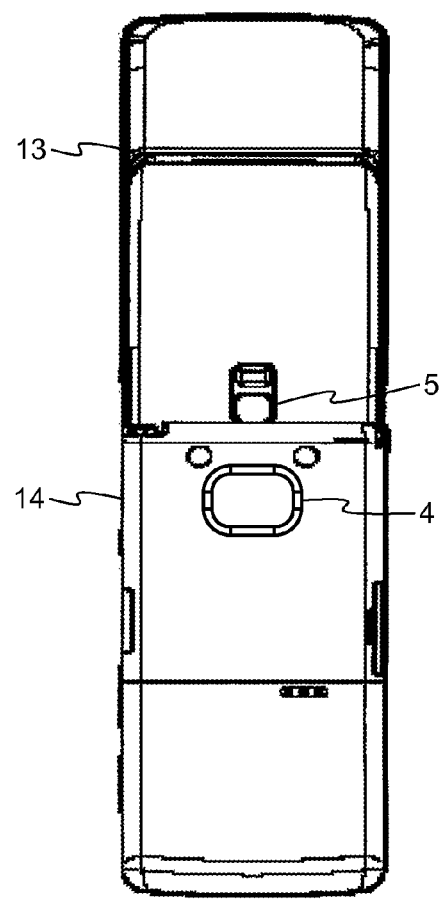
(B)

FIG.11A
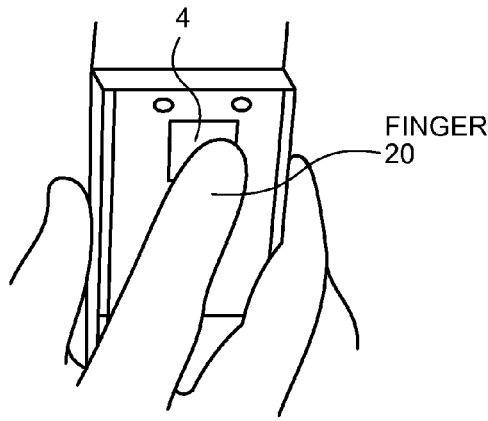
FINGER 20
FIG.11B
| EVENT ID | AMOUNT OF MOVEMENT IN LATERAL DIRECTION | AMOUNT OF MOVEMENT IN LONGITUDINAL DIRECTION |
|---|---|---|
| 1 | 0 | 1 |
| 2 | 0 | 2 |
| 3 | 0 | 5 |
| 4 | 0 | 7 |
| 5 | 0 | 13 |
| 6 | 0 | 15 |
| 7 | 0 | 17 |
| 8 | 0 | 18 |
| 9 | 0 | 14 |
| 10 | 0 | 10 |
| 11 | 0 | 8 |
| 12 | 0 | 3 |
| 13 | 0 | 0 |
FIG.11C
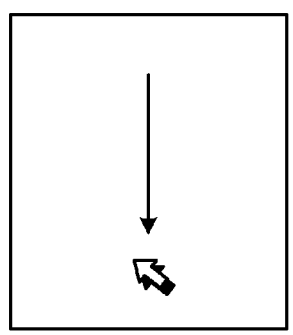

| EVENT ID | AMOUNT OF MOVEMENT IN LATERAL DIRECTION | AMOUNT OF MOVEMENT IN LONGITUDINAL DIRECTION |
|---|---|---|
| 1 | -1 | 1 |
| 2 | -1 | 1 |
| 3 | -1 | 1 |
| 4 | 0 | 1 |
| 5 | 0 | 1 |
| 6 | 0 | 1 |
| 7 | 0 | 1 |
| 8 | 0 | 0 |
| 9 | 0 | 0 |

FIG.13A
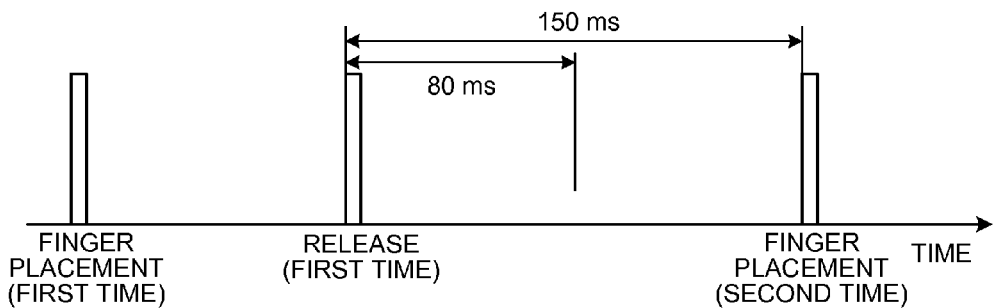
FIG.13B
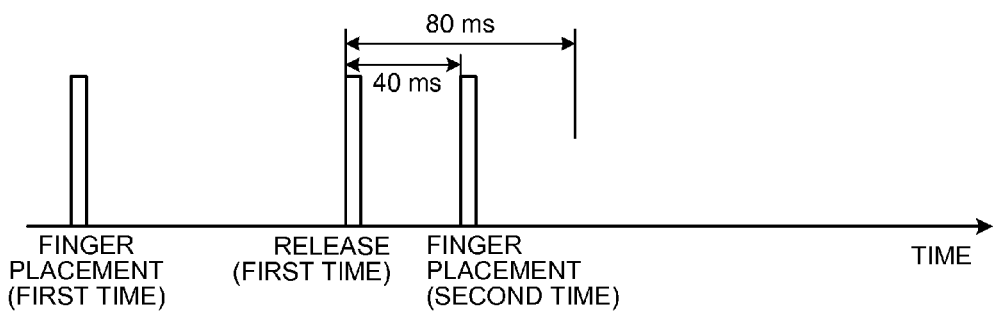
FIG.13C
| TIME STAMP | EVENT | |
|---|---|---|
| ... | ... | |
| 24.644 | PRECEDING FINGER RELEASE | } TIME DIFFERENCE IS 0.034 SECOND |
| 24.678 | FINGER PLACEMENT | |
| 25.064 | AMOUNT OF MOVEMENT (0, 2) | |
| 25.072 | AMOUNT OF MOVEMENT (0, 4) | } IF TIME DIFFERENCE FROM PRECEDING FINGER RELEASE IS EXTREMELY SMALL, NULLIFY EVENTS OCCURRING UNTIL NEXT FINGER RELEASE |
| 25.074 | AMOUNT OF MOVEMENT (0, 5) | |
| ... | ... | |
| 25.184 | FINGER RELEASE | |
| ... | ... | |

FIG.14A
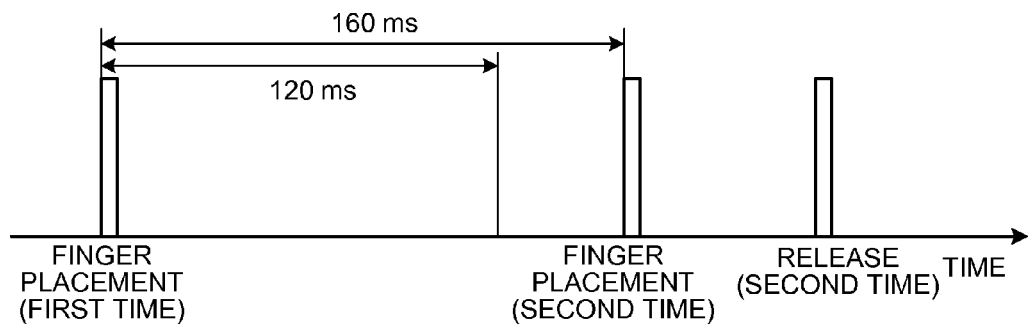
FIG.14B
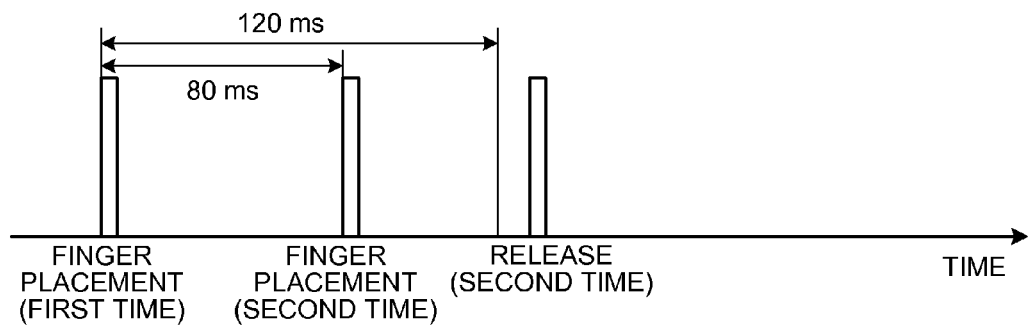
FIG.14C
| TIME STAMP | EVENT | |
|---|---|---|
| ... | ... | |
| 24.988 | FINGER PLACEMENT (FIRST TIME) | ⎫ |
| 25.064 | FINGER RELEASE (FIRST TIME) | ⎬ TIME DIFFERENCE IS 0.076 SECOND |
| 25.072 | FINGER PLACEMENT (SECOND TIME) | ⎭ |
| 25.074 | DOUBLE TAP RECOGNITION | ← NULLIFY DOUBLE TAP |
| 25.184 | FINGER RELEASE (SECOND TIME) | |
| ... | ... | |

PORTABLE TERMINAL AND INPUT CONTROL METHOD

CROSS-REFERENCE TO RELATED APPLICATION

This application is a continuation of International Application No. PCT/JP2008/069570, filed on Oct. 28, 2008, the entire contents of which are incorporated herein by reference.

FIELD

The embodiment discussed herein is directed to a portable terminal and an input control method.

BACKGROUND

In recent years, there have been increased interests on information security, and information processing devices including a fingerprint sensor for fingerprint authentication have been widely used (for example, see Japanese Laid-open Patent Publication No. 2001-265507). An information processing device including a fingerprint sensor is configured so that important processes such as login are not performed if fingerprint authentication fails. Thus, it is possible to effectively prevent information leakage, etc., to a third person.

Some of fingerprint sensors included in portable terminals such as a mobile telephone are used not only for fingerprint authentication but also for operation inputs. A fingerprint sensor is provided with a function of inputting operations as in a touch panel so as to allow for operations such as a drag and a double tap. Thus, as compared to operations achieved solely by button operations, a user of the portable terminal can easily use a high-function application such as a WEB browser.

When utilizing a fingerprint sensor for operation inputs, besides for fingerprint authentication, there has been a case in which the fingerprint sensor detects an operation not intended by a user, resulting in an erroneous operation in an information processing device such as a portable terminal. In a case where the fingerprint sensor can detect whether or not a finger of a user is placed on the fingerprint sensor and can detect a distance along which the finger moves on the fingerprint sensor and the direction thereof, but cannot determine whether the user has intentionally touched the fingerprint sensor, if the finger of the user touches the fingerprint sensor while holding the information processing device with a hand without paying attention to the fingerprint sensor, for example, such an unintentional operation is detected by the fingerprint sensor and recognized by the information processing device, thereby causing an erroneous operation.

SUMMARY

According to an aspect of an embodiment of the invention, a portable terminal includes a finger sensor that recognizes, in response to contact of a finger, the contact and a movement of the finger; and a conversion unit that converts the movement of the finger recognized by the finger sensor into an input event corresponding to an operation instruction to an application running on the portable terminal. If a period of time from recognition of release of the finger from the finger sensor to recognition of placement of the finger on the finger sensor is less than a predetermined amount of time corresponding to physical limitations of a human, the conversion unit does not convert to the input event the recognition of placement of the finger, and recognition of a movement of the finger until recognition of release of the finger after the recognition of placement of the finger.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 1 is a diagram illustrating the configuration of a mobile telephone according to an embodiment;

FIG. 11A is a diagram illustrating a state in a case where a fingerprint sensor 4 is being intentionally touched;

FIG. 11B is a diagram illustrating an example of events detected in a case where a drag action has been intentionally performed;

FIG. 11C is a diagram illustrating a movement of a cursor in a case where a drag action has been intentionally performed;

FIG. 13A is a diagram illustrating an example of a time chart in a case where a person has made a double tap action;

FIG. 13B is a diagram illustrating an example of a time chart in a case where a double tap has been erroneously recognized due to a subtle movement of a finger;

FIG. 13C is a diagram illustrating an example of events detected in a case where a double tap is erroneously recognized due to a subtle movement of a finger;

FIG. 14A is a diagram illustrating an example of a time chart in a case where a person has made a double tap action;

FIG. 14B is a diagram illustrating an example of a time chart in a case where a double tap has been erroneously recognized due to a subtle movement of a finger; and FIG. 14C is a diagram illustrating an example of events detected in a case where a double tap is erroneously recognized due to a subtle movement of a finger.

DESCRIPTION OF EMBODIMENT

Figure 2:
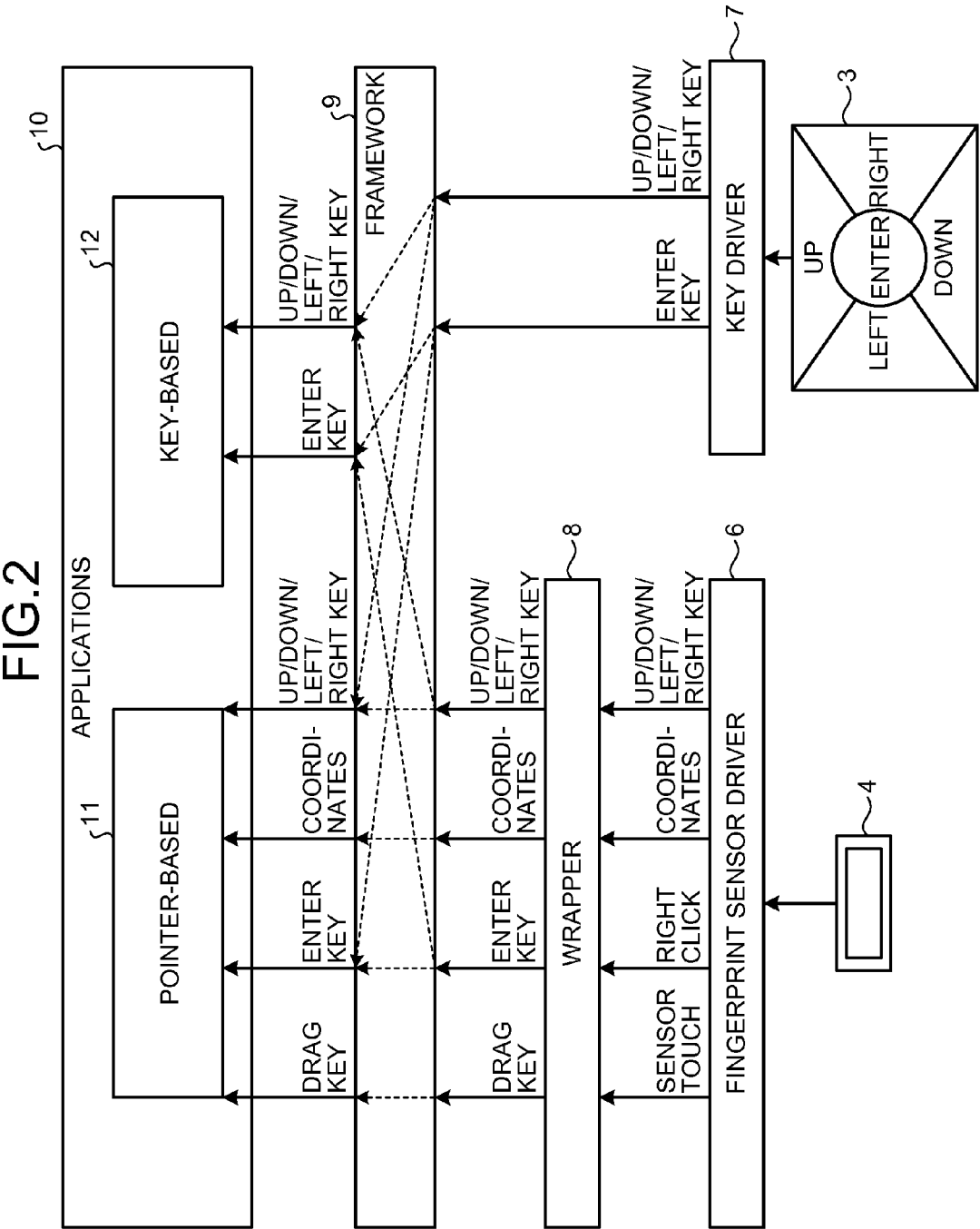
FIG. 2 is a block diagram illustrating operation input functions of the mobile telephone.

A preferred embodiment of the present invention will be explained with reference to accompanying drawings. The description will be made in the following embodiment taking a portable terminal such as a mobile telephone as an example for an information processing device disclosed in the present application. Note however that the information processing device disclosed in the present application is not limited to the mobile telephone, but includes various devices such as a personal computer and a personal digital assistant, for example.

FIG. 1 is a diagram illustrating a configuration of a mobile telephone according to the present embodiment. In FIG. 1(A), reference numeral 1 denotes a display, reference numeral 2 denotes operation keys, and reference numeral 3 denotes a multi-cursor key. In FIG. 1(B), reference numeral 4 denotes a fingerprint sensor, and reference numeral 5 denotes a camera.

The mobile telephone is of a flip type, having an upper casing 13 and a lower casing 14. In the unfolded state, the mobile telephone includes a front side having the display 1, the operation keys 2, and the multi-cursor key 3, and a rear side having the fingerprint sensor 4 and the camera 5. The upper casing 13 accommodates the display 1 on the front side thereof, and accommodates the camera 5 on the rear side thereof. The lower casing 14 accommodates the operation keys 2 and the multi-cursor key 3 on the front side thereof, and accommodates the fingerprint sensor 4 on the rear side thereof. As illustrated in FIG. 1, the size of the fingerprint sensor 4 is very small as compared to that of the display 1, and the size of the fingerprint sensor 4 is about 10 mm in the longitudinal direction thereof.

Now, a description will be made about an erroneous operation caused when a finger of a user unintentionally touches the fingerprint sensor 4 since the fingerprint sensor is positioned at the rear surface of the mobile telephone. The mobile telephone according to the present embodiment includes the fingerprint sensor positioned at the rear surface thereof. Thus, a user can touch the fingerprint sensor with a finger while holding the mobile telephone with one hand. The fingerprint sensor 4 detects the direction and the amount of a finger movement by pattern-matching fingerprint images obtained every 8 ms. The velocity that a person moves a finger is about 20 cm/s at maximum. Therefore, even for images obtained by the fingerprint sensor 4 with the size of about 10 mm in the longitudinal direction thereof, images obtained at an interval of 8 ms include portions where fingerprint patterns are matched with each other. If the portions where fingerprint patterns are matched with each other are detected, it is possible to calculate which direction and how much the finger has moved while these images are obtained.

Figure 10:
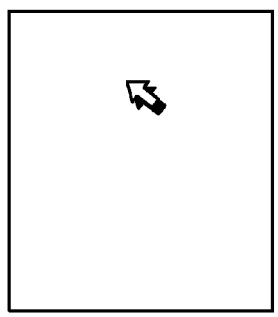
FIG. 10 is a diagram illustrating a state of a cursor in a case where no finger is placed on a fingerprint sensor.

When a finger is completely off the fingerprint sensor 4, images obtained by the fingerprint sensor 4 contain no fingerprint images. Therefore, no finger movement is detected, and a cursor displayed on the display 1 remains still as illustrated in FIG. 10.

In a case where a user intentionally touches the fingerprint sensor 4, a finger is placed on the fingerprint sensor so as to be vertical with respect to the longitudinal direction of the fingerprint sensor 4 as illustrated in FIG. 11A, and a drag operation or the like is performed while placing the finger in such a state. Here, if a drag operation in the downward direction is performed, the amount of movement in the longitudinal direction is successively detected in the fingerprint sensor 4 as illustrated in FIG. 11B, and the cursor displayed on the display 1 moves in the downward direction as illustrated in FIG. 11C.

Figure 12A:
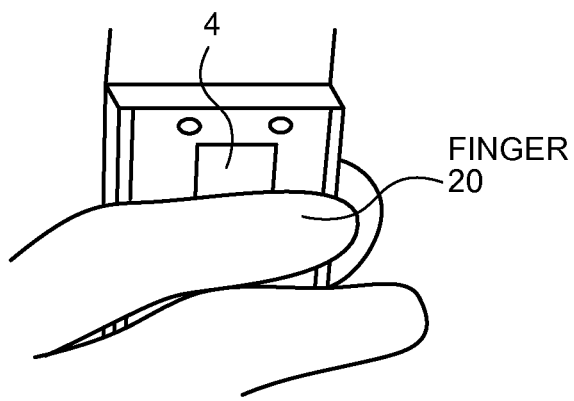
FIG. 12A is a diagram illustrating a state in a case where the fingerprint sensor 4 is being unintentionally touched by a finger.
Figure 12B:
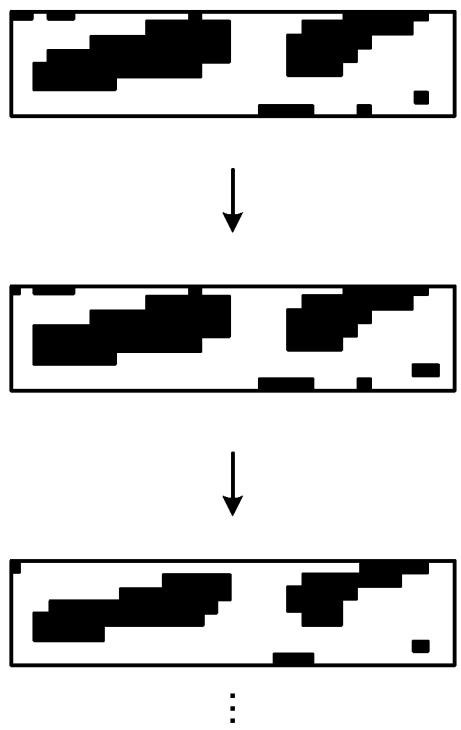
FIG. 12B is a diagram illustrating an example of fingerprint images obtained in a case where the fingerprint sensor 4 is being unintentionally touched by a finger.

Since the fingerprint sensor is positioned on the rear surface of the mobile telephone, a finger can touch the fingerprint sensor while holding the mobile telephone with one hand. On the other hand, however, when a user holds the mobile telephone as illustrated in FIG. 12A, for example, the finger of the user may unintentionally touch an edge portion of the fingerprint sensor 4. In such a case, images containing fingerprint images as illustrated in FIG. 12B are successively obtained in the fingerprint sensor 4. Even when the finger does not slide on the fingerprint sensor, images may be different from one another due to a subtle finger movement caused when the finger is unintentionally touching the fingerprint sensor, for example, a very small movement in the vertical direction.

Figures 12C, 12D:
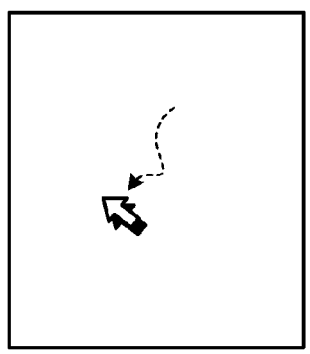
FIG. 12C is a diagram illustrating an example of events detected in a case where the fingerprint sensor 4 is being unintentionally touched by a finger.
FIG. 12D is a diagram illustrating a movement of a cursor in a case where the fingerprint sensor 4 is being unintentionally touched by a finger.

If images are different from each other as described above, the fingerprint sensor 4 detects the difference therebetween as a finger movement as illustrated in FIG. 12C. As a result, with the conventional mobile telephone, an erroneous operation has occurred such that the cursor displayed on the display 1 moves in spite that the user has no such an intention as illustrated in FIG. 12D.

Next, the input control method according to the present embodiment will be described. In order to prevent an erroneous operation from being caused by the unintentional contact of a finger of a user to the fingerprint sensor 4 as described above, when a movement beyond physical limitations of a human is detected, such a movement and a series of movements generated by the movement are ignored in the input control method according to the present embodiment.

For example, in a case where a person intentionally releases a finger from the fingerprint sensor and then places the finger again on the fingerprint sensor, an action of moving the finger up and down is included. Thus, at least about 80 ms is required from release of the finger from the fingerprint sensor 4 to contact of the finger to the fingerprint sensor 4 for the next operation.

FIG. 13A is a diagram illustrating a time chart in a case where after a person has performed a slide action extending from a "finger placement (the first time)" to a "finger release (the first time)", the person performs a "finger placement (the second time)" in order to perform the next action, for example, a tap, a double tap, a slide, or the like. As described above, an action of moving a finger up and down needs a minimum amount of time required due to the physical limitations of a human. As illustrated in FIG. 13A, 150 ms is required from the detection of the first finger release to the detection of the second finger placement.

On the other hand, in a case of erroneous recognition in which a finger placement or a finger movement is recognized due to unintentional contact of a finger to the fingerprint sensor 4, if the fingerprint sensor detects a finger release and a finger placement with an interval shorter than 80 ms, such an interval is less than the minimum amount of time required due to the physical limitations of a human. Thus, the detection result is determined to be erroneous recognition, and it is possible not to detect such a finger release and such a finger placement as a movement of the finger.

FIG. 13B is a time chart illustrating outputs of the fingerprint sensor in a case where a user unintentionally touches the fingerprint sensor, resulting in erroneous recognition. In FIG. 13B, after the erroneous recognition of a "finger placement (the first time)", an interval between the erroneous recognition of a "finger release (the first time)" and the erroneous recognition of a "finger placement (the second time)" is 40 ms.

In the input control method according to the present embodiment, if the amount of time from a finger release to the following finger placement is less than 80 ms, the next-detected "finger placement (the second time)" and inputs following the "finger placement (the second time)" are ignored. Thus, the result of erroneous recognition due to the unintentional contact of a finger to the fingerprint sensor is prevented from being erroneously detected as the movement of the finger. Note that it is not possible to prevent the "finger placement (the first time)" from being erroneously detected as the movement of the finger since there is a long interval between the erroneous recognition of the "finger placement (the first time)" and the erroneous recognition of the "finger release (the first time)". Note however that since not only the respective inputs of the "finger placement (the second time)" and the "finger placement (the second time)" are ignored but also inputs following the "finger placement (the second time)" are ignored, it is possible to reduce an influence due to the erroneous recognition caused by the unintentional contact of the finger of the user to the fingerprint sensor.

For example, in the example illustrated in FIG. 13C, since the amount of time from the erroneous recognition of the "finger release (the first time)" to the erroneous recognition of the "finger placement (the second time)" is only 34 ms, the "finger release (the first time)", the "finger placement (the second time)", and events occurring until the next finger release are ignored. Thus, the erroneous recognition due to the unintentional contact of the finger of the user to the fingerprint sensor is prevented from being erroneously detected as the movement of the finger.

Note that not the amount of time from a finger release to a finger placement but the amount of time from a finger placement to the next finger placement may be measured in order to prevent erroneous recognition from being detected as the movement of the finger. If a person performs a double tap action, there is required an action of moving a finger up and down. Thus, at least about 120 ms is required from contact of the finger to the fingerprint sensor 4 for the first tap to contact of the finger to the fingerprint sensor 4 for the second tap.

FIG. 14A is a diagram illustrating an example of a time chart in a case where a person has made a double tap action. As illustrated in FIG. 14A, in this case, 160 ms is required from the detection of the first finger placement to the detection of the second finger placement. Note that FIG. 14A omits the illustration of the timing of the finger release following the first finger placement.

On the other hand, in a case where a double tap is erroneously recognized due to a subtle movement of a finger unintentionally touching the fingerprint sensor 4, an action of moving the finger up and down is not performed. Thus, the amount of time required from the first finger placement to the second finger placement is less than 120 ms.

FIG. 14B is a diagram illustrating an example of a time chart in a case where a double tap has been erroneously recognized due to a subtle movement of a finger. As illustrated in FIG. 14B, in this case, only 80 ms is required from the detection of the first finger placement to the detection of the second finger placement. Note that FIG. 14B also omits the illustration of the timing of the finger release following the first finger placement.

Thus, in the input control method according to the present embodiment, another finger placement detected until 120 ms has passed since a finger placement is ignored so as to prevent the erroneous recognition of the double tap. In the example illustrated in FIG. 14C, for example, the second finger placement is ignored because only 76 ms has passed since the first finger placement, thereby preventing the erroneous recognition of the double tap due to the unintentional contact of the finger.

In the input control method according to the present embodiment, the amount of movement of a finger (velocity), a difference in the amount of movement of the finger (acceleration), the moving direction of the finger, etc., are monitored, and when a movement beyond physical limitations of a human is detected, such a movement is ignored, thereby preventing the erroneous recognition of various operations.

Note that while the values of 80 ms and 120 ms are stated as the threshold values used to prevent the erroneous recognition of a double tap in the description above, these are examples considering the physical limitations of a human. These values may be suitably changed depending on the characteristics of the fingerprint sensor 4, the physical capabilities of a user, etc.

Next, a functional configuration regarding the input control for the mobile telephone illustrated in FIG. 1 will be described. FIG. 2 is a block diagram illustrating operation input functions of the mobile telephone illustrated in FIG. 1. Reference numeral 3 denotes the multi-cursor key, reference numeral 4 denotes the fingerprint sensor, reference numeral 6 denotes a fingerprint sensor driver, reference numeral 7 denotes a key driver, reference numeral 8 denotes a wrapper, reference numeral 9 denotes a framework, reference numeral 10 denotes applications, reference numeral 11 denotes a pointer-based application, and reference numeral 12 denotes a key-based application.

The fingerprint sensor driver 6 determines a finger action on the basis of finger image information detected by the fingerprint sensor 4 to notify various types of events to the wrapper 8. These events include an up/down/left/right key event, a coordinate event, a right click event, a sensor touch event, etc. The up/down/left/right key event is an event obtained by converting the direction of a finger to a movement in one of the up/down/left/right directions when a user has slid the finger on the fingerprint sensor 4. The coordinate event is an event obtained by converting the direction and the amount of movement of a finger to relative coordinates (moving coordinates) when a user has slid the finger on the fingerprint sensor 4. The right click event is an event indicating that the fingerprint sensor 4 has been tapped. The sensor touch event is an event indicating contact of a finger to the fingerprint sensor 4, and release of the finger from the fingerprint sensor 4.

When an up/down/left/right key or an enter key of the multi-cursor key 3 is pressed, the key driver 7 notifies the event indicating the pressed key to the applications 10 via the framework 9.

The wrapper 8 corrects the coordinate event, the up/down/left/right key event, etc., which have been notified from the fingerprint sensor driver 6 so that the user can perform operations without feeling awkwardness, and then notifies the corrected event to the applications 10 via the framework 9. The wrapper 8 also converts the right click event or the sensor touch event notified from the fingerprint sensor driver 6 to an event necessary for the applications 10.

For example, the wrapper 8 converts the sensor touch event and the coordinate event notified from the fingerprint sensor driver 6 to a drag key event indicating a drag operation to notify the drag key event to the applications 10 via the framework 9. The wrapper 8 also converts successively-detected right click events to a double tap event (enter key event) to notify the double tap event to the applications 10 via the framework 9.

Moreover, the wrapper 8 performs the input control method according to the present embodiment described above in order to prevent an erroneous operation due to an unintentional operation by a user.

Figure 9:
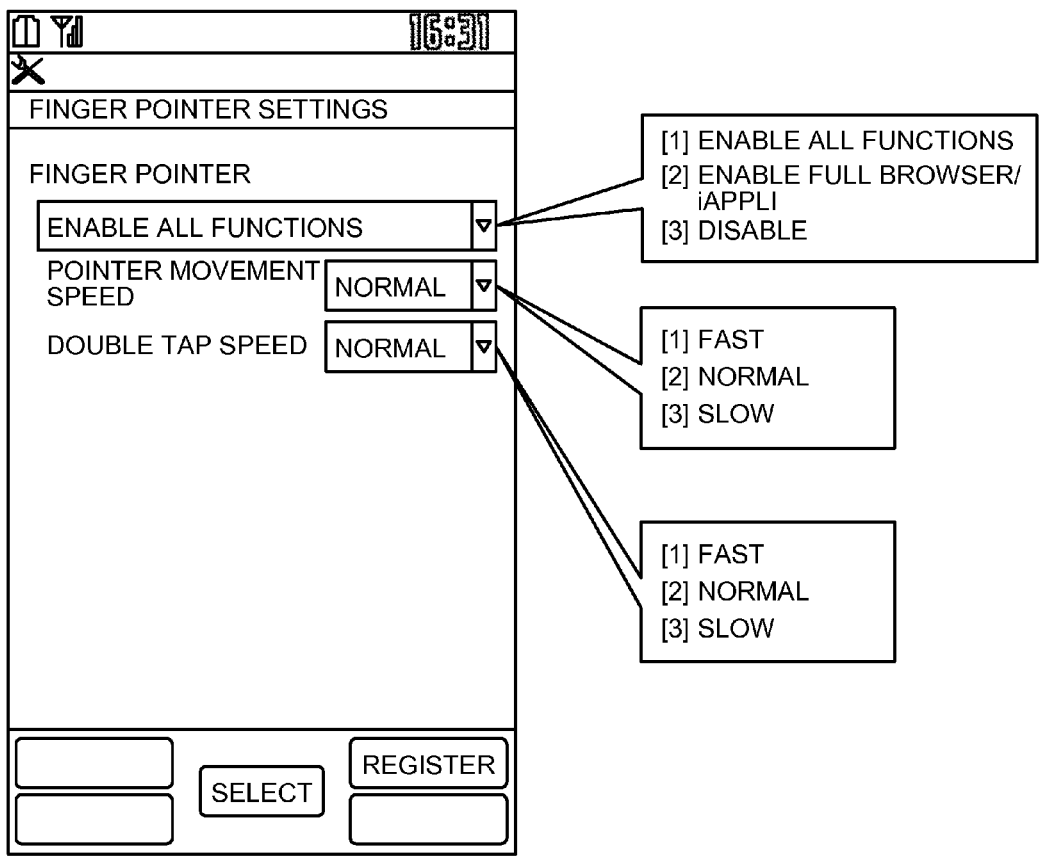
FIG. 9 is a diagram illustrating a finger pointer setting screen of the mobile telephone.

The framework 9 filters events notified from the wrapper 8 on the basis of settings on the finger pointer setting screen of FIG. 9. That is, if [1] Enable All Functions is selected on the finger pointer setting screen, the framework 9 always notifies events notified from the wrapper 8 to the applications 10. If [2] Enable Full Browser/i-Appli is selected on the finger pointer setting screen, the framework 9 notifies events notified from the wrapper 8 only to WEB browser applications. If [3] Disable is selected on the finger pointer setting screen, the framework 9 does not notify events notified from the wrapper 8 to the applications 10.

The pointer-based application 11 among the applications 10 operates on the basis of various events notified from the wrapper 8 and the key driver 7 via the framework 9. The key-based application 12 among the applications 10 operates on the basis of various events notified from the key driver 7 via the framework 9.

Figure 3:
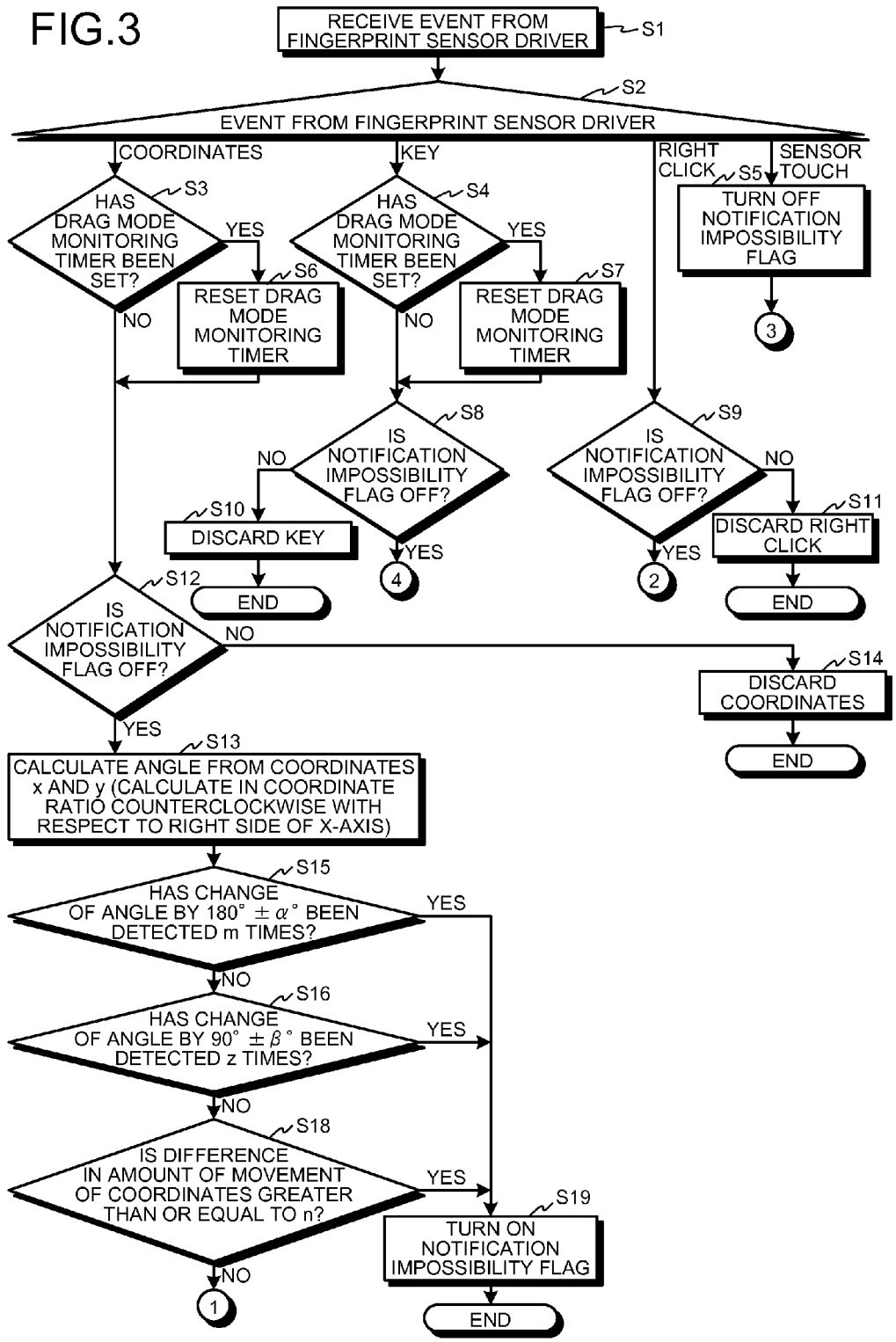
FIG. 3 is a flow chart illustrating processes performed by the operation input functions of the mobile telephone illustrated in FIG. 2.

FIG. 3 is a flow chart of the processes performed by the wrapper 8 illustrated in FIG. 2. The wrapper 8 receives an event from the fingerprint sensor driver 6 (step S1). Then, the wrapper 8 directs the process depending on each event received from the fingerprint sensor driver 6 (step S2). Specifically, the process proceeds to step S3 when a coordinate event is received, to step S4 when a key event is received, to step S9 when a right click event is received, and to step S5 when a sensor touch event is received.

When the received event is a coordinate event, the wrapper 8 determines whether a drag mode monitoring timer has been set, and if it has not been set (no in step S3), the process proceeds to step S12. On the other hand, if a drag mode monitoring timer has been set (yes in step S3), the drag mode monitoring timer is reset (step S6), and then the process proceeds to step S12.

Then, the wrapper 8 determines whether the notification impossibility flag is OFF, and the process proceeds to step S13 if it is OFF (yes in step S12). On the other hand, if the notification impossibility flag is ON, i.e., if an operation not intended by the user is detected (no in step S12), the coordinate event is discarded, and the process regarding this event is ended (step S14).

When the notification impossibility flag is OFF, the wrapper 8 converts the coordinates indicated by the coordinate event to an angle (step S13). Specifically, the wrapper 8 calculates the angle of a line segment connecting the coordinates indicated by the coordinate event and the origin with respect to the X axis. For example, if the notified coordinates are (1, 0), 0° is calculated as the angle. If the notified coordinates are (1, −1), 45° is calculated as the angle. If the notified coordinates are (0, 1), 270° is calculated as the angle.

Then, the wrapper 8 compares the calculated angle with the angle calculated on the basis of the coordinates notified previously, and determines whether the angle has changed by 180±α°, and the change of the angle by 180±α° has occurred m consecutive times (step S15). Here, if these conditions are satisfied (yes in step S15), the wrapper 8 turns ON the notification impossibility flag, and ends the process regarding this event (step S19).

That is, since consecutively detecting inversions of finger movement is unlikely in view of human capabilities, the wrapper 8 considers the detection of such an incident as the detection of an operation not intended by the user, and discontinues the notification of the event to the upper level.

On the other hand, if the conditions of step S15 are not satisfied, the wrapper 8 compares the angle calculated in step S13 with the angle calculated on the basis of the coordinates notified previously to determine whether the angle has changed by 90±β°, and the change of the angle by 90±β° has occurred z consecutive times (step S16). Here, if these conditions are satisfied (yes in step S16), the wrapper 8 turns ON the notification impossibility flag, and ends the process regarding this event (step S19).

That is, since consecutively detecting a finger movement in the vertical direction over and over is unlikely in view of human capabilities, the wrapper 8 considers the detection of such an incident as the detection of an operation not intended by the user, and discontinues the notification of the event to the upper level.

On the other hand, if the conditions of step S16 are not satisfied, the wrapper 8 determines whether the difference in the amount of movement is greater than or equal to the threshold n (step S18), wherein the difference in the amount of movement is the difference between the amount of movement notified in the current coordinate event and the amount of movement notified in the previous coordinate event. Here, if the difference in the amount of movement is greater than or equal to n (yes in step S18), the wrapper 8 turns ON the notification impossibility flag and ends the process regarding this event (step S19).

That is, since the difference in the amount of movement being greater than or equal to the threshold n is unlikely in view of human capabilities, the wrapper 8 considers the detection of such an incident as the detection of an operation not intended by the user, and discontinues the notification of the event to the upper level.

On the other hand, if the conditions of step S18 are not satisfied, the wrapper 8 proceeds to Process 1.

If the event received in step S1 is a key event, the wrapper 8 determines whether a drag mode monitoring timer has been set, and if it has not been set (no in step S4), the process proceeds to step S8. On the other hand, if a drag mode monitoring timer has been set (yes in step S4), the drag mode monitoring timer is reset (step S7), and then the process proceeds to step S8.

Then, the wrapper 8 determines whether the notification impossibility flag is OFF, and the process proceeds to Process 4 if it is OFF (yes in step S8). On the other hand, if the notification impossibility flag is ON, i.e., if an operation not intended by the user is detected (no in step S8), the key event is discarded, and the process regarding this event is ended (step S10).

If the event received in step S1 is a right click event, the wrapper 8 determines whether the notification impossibility flag is OFF, and if it is OFF (yes in step S9), the process proceeds to Process 2. On the other hand, if the notification impossibility flag is ON, i.e., if an operation not intended by the user is detected (no in step S9), the right click event is discarded, and the process regarding this event is ended (step S11).

If the event received in step S1 is a sensor touch event, the wrapper 8 sets the notification impossibility flag to OFF (step S5) and proceeds to Process 3. That is, in this case, the wrapper 8 considers that the detection of an operation not intended by the user has ended, and resumes notification of events to the upper level.

Figure 4:
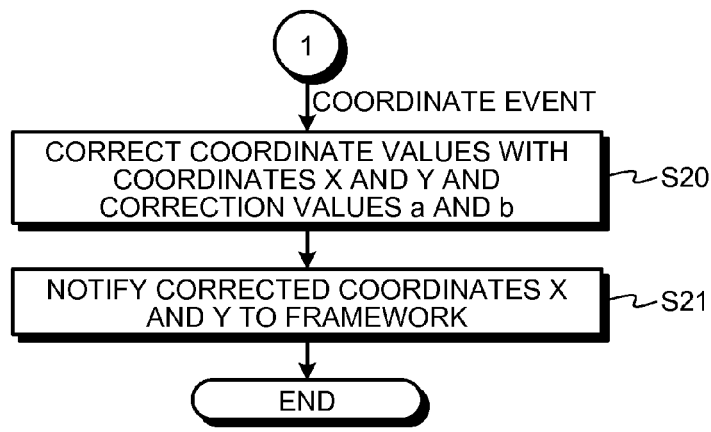
FIG. 4 is a flow chart of Process 1 among the processes performed by the operation input functions of the mobile telephone illustrated in FIG. 2.

FIG. 4 is a flow chart of Process 1 illustrated in FIG. 3. With the X coordinate of the coordinate event and the correction values a and b, the wrapper 8 calculates the corrected coordinate X by an expression: Corrected Coordinate X=Notified X Coordinate×Correction Value a/Correction Value b. Also, with the Y coordinate of the coordinate event and the correction values a and b, the wrapper 8 calculates the corrected coordinate Y by an expression: Corrected Coordinate Y=Notified Y Coordinate×Correction Value a/Correction Value b (step S20).

Then, the wrapper 8 notifies the calculated corrected coordinates X and Y as a coordinate event to the framework 9 (step S21).

Figure 5:
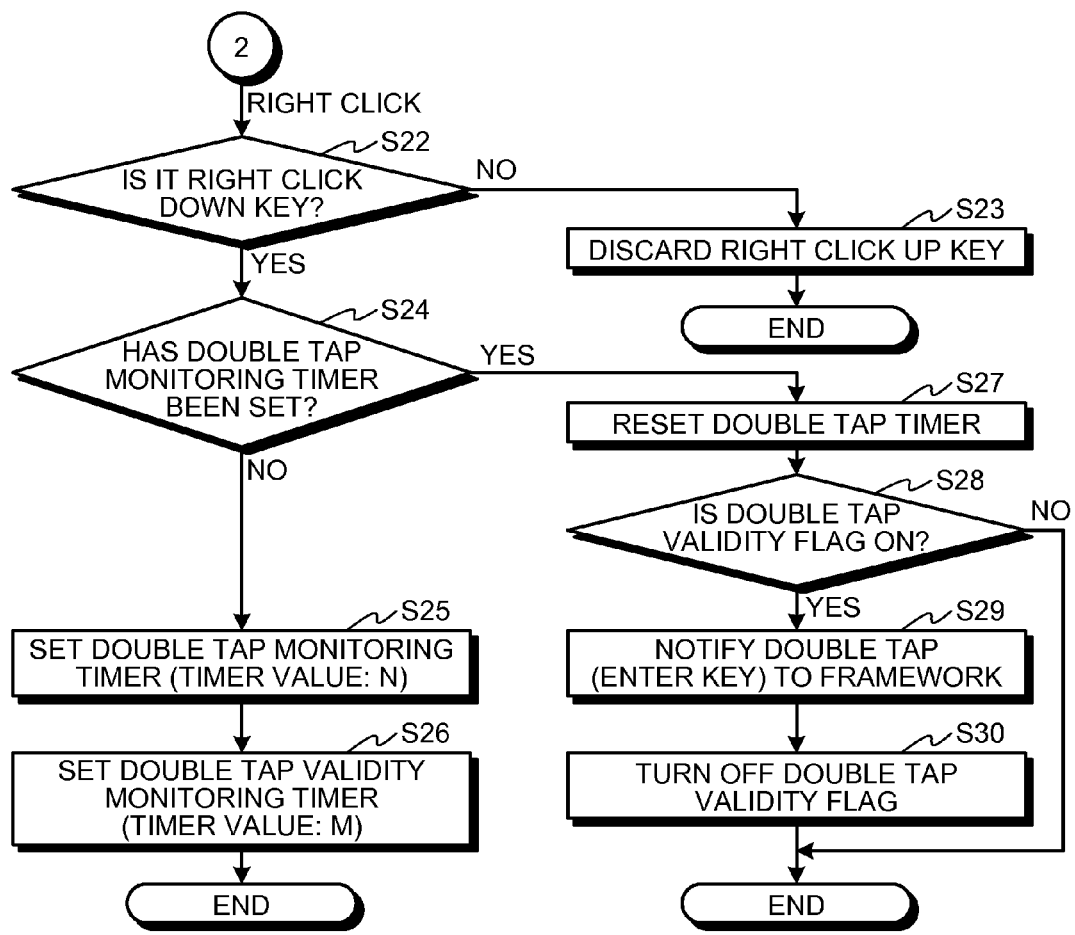
FIG. 5 is a flow chart of Process 2 among the processes performed by the operation input functions of the mobile telephone illustrated in FIG. 2.

FIG. 5 is a flow chart of Process 2 illustrated in FIG. 3. The wrapper 8 proceeds to step S24 if the right click event is a right click Down key (representing when a finger touches the fingerprint sensor 4) (yes in step S22). On the other hand, if the right click event is a right click Up key (representing when a finger touches the fingerprint sensor 4 and releases immediately), the event is unnecessary and is therefore discarded. The process regarding this event is ended (step S23).

If the right click event is a right click Down key, the wrapper 8 checks whether a double tap monitoring timer, which is a timer for determining a double tap, has been set (step S24). Here, if a double tap monitoring timer has not been set, i.e., if the current right click event is the first tap (no in step S24), the wrapper 8 sets a timer value N to the double tap monitoring timer (step S25). The timer value N is the maximum value of the interval between two consecutive taps that are regarded as a double tap.

If a double tap monitoring timer has not been set in step S24, the wrapper 8 sets a timer value M to a double tap validity monitoring timer, and ends the process regarding this event (step S26). The double tap validity monitoring timer is a timer for determining the interval from a tap down (finger placement) to the next tap down (finger placement), and the double tap validity flag is set to ON when it times out. The timer value M is the minimum value of the interval between tap downs (finger placement) when a person makes consecutive taps, and is 120 ms, for example.

If the double tap monitoring timer has been set in step S24, i.e., if this event is the second tap in a double tap (yes in step S24), the wrapper 8 resets the double tap monitoring timer (step S27).

Then, if the double tap validity flag is ON, i.e., if the double tap validity monitoring timer has already timed out (yes in step S28), a double tap event (enter key event) is notified to the framework 9 (step S29). Then, the wrapper 8 sets the double tap validity flag to OFF, and ends the process regarding this event (step S30).

On the other hand, if the double tap validity flag is OFF, i.e., if the amount of time equivalent to the timer value M has not elapsed since the previous tap down (finger placement) (no in step S28), the wrapper 8 ends the process regarding this event without notifying the double tap event (enter key event).

Figure 6:
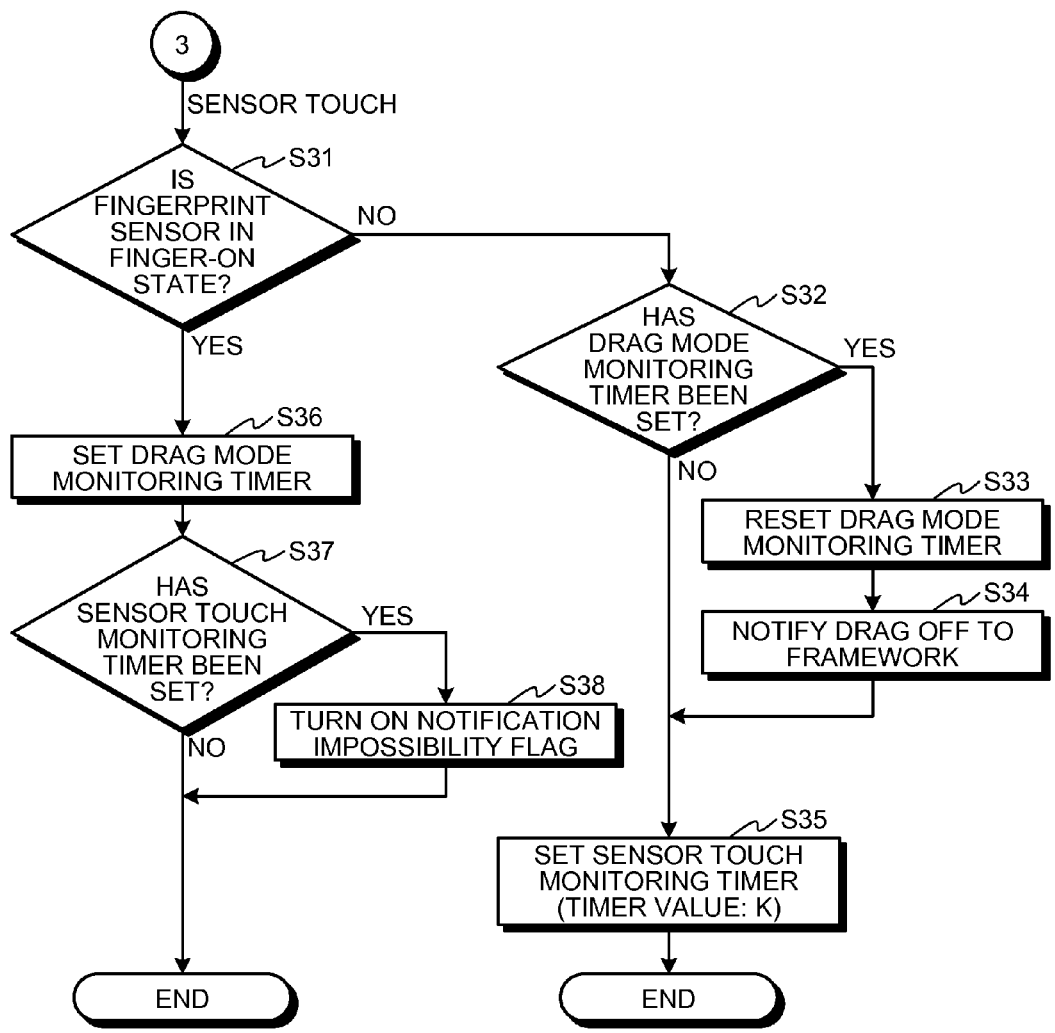
FIG. 6 is a flow chart of Process 3 among the processes performed by the operation input functions of the mobile telephone illustrated in FIG. 2.

FIG. 6 is a flow chart of Process 3 illustrated in FIG. 3. The wrapper 8 determines whether the sensor touch event indicates a finger-on state (state where a finger is touching the fingerprint sensor) (step S31). Here, if it is not the finger-on state, i.e., if a finger-off state is detected (no in step S31), the wrapper 8 determines whether a drag mode monitoring timer has been set. Then, if a drag mode monitoring timer has been set (yes in step S32), the drag mode monitoring timer is reset (step S33), and drag OFF (drag has ended) is notified to the framework 9 (step S34).

Then, the wrapper 8 sets a timer value K to the sensor touch monitoring timer, and ends the process regarding this event (step S35). The sensor touch monitoring timer is a timer for determining the interval from a finger release to a finger placement. The timer value K is the minimum value of the amount of time from a finger release to a finger placement when a person makes consecutive taps, and is 80 ms, for example.

On the other hand, if it is a finger-on state in step S31, i.e., if a finger-placed state is detected (yes in step S31), the wrapper 8 sets a drag mode monitoring timer (step S36). The drag mode monitoring timer is a timer for preventing a simple tap or a finger placement from being erroneously recognized as a drag operation, and notifies drag ON (drag has started) to the framework 9 when it times out.

Then, if a sensor touch monitoring timer has been set (yes in step S37), the wrapper 8 turns ON the notification impossibility flag and discontinues the notification of the event to the upper level (step S38). Then, the wrapper 8 ends the process regarding this event.

Figure 7:
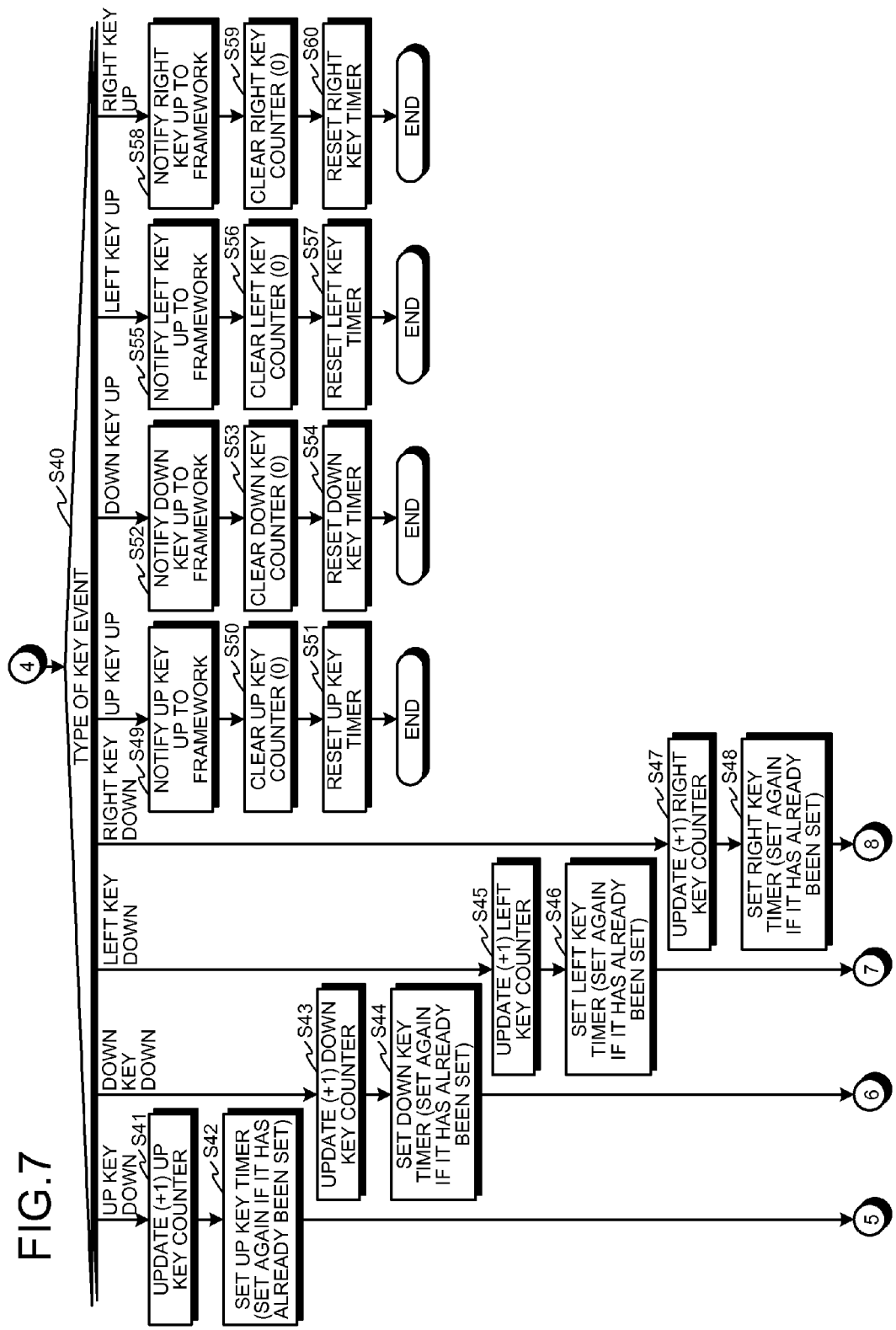
FIG. 7 is a flow chart of Process 4 among the processes performed by the operation input functions of the mobile telephone illustrated in FIG. 2.

FIG. 7 is a flow chart of Process 4 illustrated in FIG. 3. The wrapper 8 determines the type of the key event (step S40) to direct the process. Specifically, the process proceeds to step S41 if it is up key Down, to step S43 if it is down key Down, to step S45 if it is left key Down, to step S47 if it is right key Down, to step S49 if it is up key Up, to step S52 if it is down key Up, to step S55 if it is left key Up, and to step S58 if it is right key Up.

If it is up key Down, the wrapper 8 updates (+1) the up key counter (step S41) in order to monitor the number of times an up key event is notified. In order to monitor up key events being notified continuously within a certain amount of time, an up key timer is set. If the up key timer has already been set, the timer is set again (step S42), and the process proceeds to Process 5. When the up key timer times out, the up key counter is cleared to 0.

If it is down key Down, the wrapper 8 updates (+1) the down key counter (step S43) in order to monitor the number of times a down key event is notified. In order to monitor down key events being notified continuously within a certain amount of time, a down key timer is set. If the down key timer has already been set, the timer is set again (step S44), and the process proceeds to Process 6. When the down key timer times out, the down key counter is cleared to 0.

If it is left key Down, the wrapper 8 updates (+1) the left key counter (step S45) in order to monitor the number of times a left key event is notified. In order to monitor left key events being notified continuously within a certain amount of time, a left key timer is set. If the left key timer has already been set, the timer is set again (step S46), and the process proceeds to Process 7. When the left key timer times out, the left key counter is cleared to 0.

If it is right key Down, the wrapper 8 updates (+1) the right key counter (step S47) in order to monitor the number of times a right key event is notified. In order to monitor right key events being notified continuously within a certain amount of time, a right key timer is set. If the right key timer has already been set, the timer is set again (step S48), and the process proceeds to Process 8. When the right key timer times out, the right key counter is cleared to 0.

If it is up key Up, the wrapper 8 notifies up key Up to the framework 9 (step S49), clears the up key counter to 0 (step S50) and resets the up key timer (step S51).

If it is down key Up, the wrapper 8 notifies down key Up to the framework 9 (step S52), clears the down key counter to 0 (step S53) and resets the down key timer (step S54).

If it is left key Up, the wrapper 8 notifies left key Up to the framework 9 (step S55), clears the left key counter to 0 (step S56) and resets the left key timer (step S57).

If it is right key Up, the wrapper 8 notifies right key Up to the framework 9 (step S58), clears the right key counter to 0 (step S59) and resets the right key timer (step S60).

Figure 8:
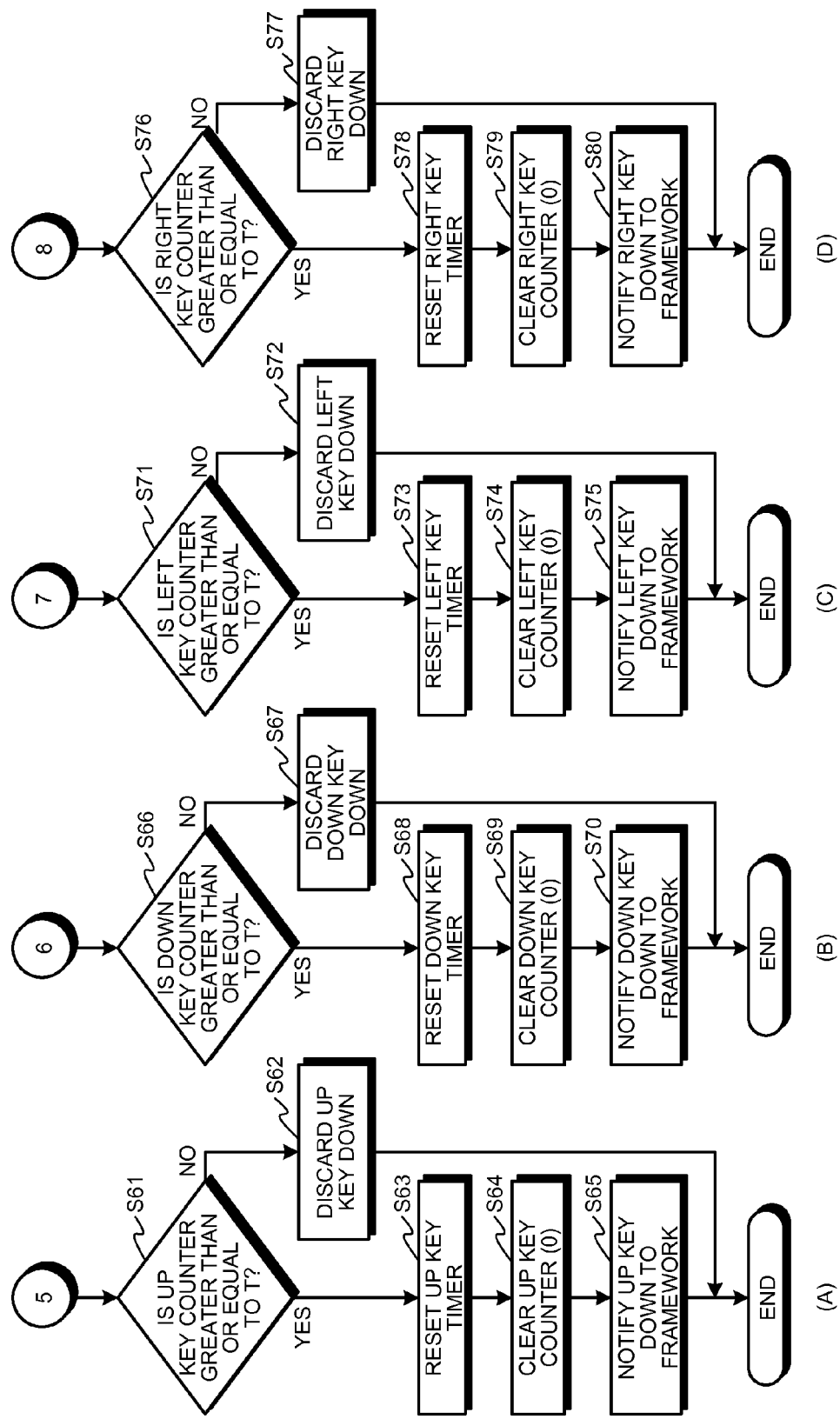
FIG. 8 is a flow chart of Processes 5 to 8 following Process 4 performed by the operation input functions of the mobile telephone illustrated in FIG. 7.

FIG. 8 is a flow chart of Processes 5 to 8 following Process 4 illustrated in FIG. 7. Specifically, FIG. 8(A) corresponds to Process 5, FIG. 8(B) corresponds to Process 6, FIG. 8(C) corresponds to Process 7, and FIG. 8(D) corresponds to Process 8.

In Process 5, if the up key counter is not greater than or equal to the threshold T (no in step S61), the wrapper 8 discards the up key event and notifies nothing to the framework 9 (step S62). On the other hand, if the up key counter is greater than or equal to the threshold T (yes in step S61), it resets the up key timer (step S63), clears the up key counter to 0 (step S64), and notifies up key Down to the framework 9 (step S65).

In Process 6, if the down key counter is not greater than or equal to the threshold T (no in step S66), the wrapper 8 discards the down key event and notifies nothing to the framework 9 (step S67). On the other hand, if the down key counter is greater than or equal to the threshold T (yes in step S66), the wrapper 8 resets the down key timer (step S68), clears the down key counter to 0 (step S69), and notifies down key Down to the framework 9 (step S70).

In Process 7, if the left key counter is not greater than or equal to the threshold T (no in step S71), the wrapper 8 discards the left key event and notifies nothing to the framework 9 (step S72). On the other hand, if the left key counter is greater than or equal to the threshold T (yes in step S71), the wrapper 8 resets the left key timer (step S73), clears the left key counter to 0 (step S74), and notifies left key Down to the framework 9 (step S75).

In Process 8, if the right key counter is not greater than or equal to the threshold T (no in step S76), the wrapper 8 discards the right key event and notifies nothing to the framework 9 (step S77). On the other hand, if the right key counter is greater than or equal to the threshold T (yes in step S76), the wrapper 8 resets the right key timer (step S78), clears the right key counter to 0 (step S79), and notifies right key Down to the framework 9 (step S80).

FIG. 9 is a diagram illustrating an example of a finger pointer setting screen of a mobile telephone. Each pull-down of the finger pointer setting screen allows for a selection among [1] to [3], and the selections are set when Register in a lower portion of the screen is pressed. The "Finger Pointer" pull-down has already been described, and therefore will not be described below.

The "Pointer Movement Speed" is a pull-down for selecting the amount of correction used for correction of up/down/left/right keys and coordinates notified from the fingerprint sensor, and allows one to select one of [1] Fast, [2] Normal and [3] Slow. For example, if Fast is selected, the pointer moves fast on a browser, etc., even by sliding a finger a little on the fingerprint sensor. The correction values a and b of step S20 illustrated in the flow chart of FIG. 4 are changed depending on the selection on this pull-down. For example, the selections "Fast", "Normal", and "Slow" correspond to correction values a and b of "4/2", "3/2", and "1/1", respectively, resulting in pointer movements of ×2, ×1.5 and ×1, respectively. Note that the correction values a and b may have different values.

The threshold T in step S61, step S66, step S71, and step S76 illustrated in the flow chart of FIG. 8 is also changed depending on the selection of the "Pointer Movement Speed". For example, the selections "Fast", "Normal", and "Slow" correspond to thresholds T of "5", "10", and "15", respectively. Note that the threshold T may have a different value for each of up, down, left, and right.

The "Double Tap Speed" is a pull-down for selecting the interval from the first tap to the second tap in a double tap, and allows one to select one of [1] Fast, [2] Normal and [3] Slow. The double tap monitoring timer value N of step S25 illustrated in the flow chart of FIG. 5 is changed depending on the selection of this pull-down. For example, the selections "Fast", "Normal", and "Slow" correspond to timer values N of "200 ms", "300 ms", and "400 ms", respectively.

As described above, detection results resulting from unintentional operations are excluded on the basis of characteristic phenomena which are detected when a finger touches the fingerprint sensor unintentionally, and it is therefore possible to prevent an erroneous operation due to an unintentional operation, thereby improving the operability thereof and obtaining pleasant usability.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A portable terminal comprising:
   a finger sensor that recognizes, in response to contact of a finger, a contact and a movement of the finger; and a conversion unit that converts the movement of the finger recognized by the finger sensor into an input event corresponding to an operation instruction to an application running on the portable terminal, wherein
   if a period of time from recognition of release of the finger from the finger sensor to recognition of placement of the finger on the finger sensor is less than a predetermined amount of time, then the conversion unit does not convert to the input event the recognition of the placement of the finger and the recognition of the movement of the finger until the recognition of the release of the finger after the recognition of the placement of the finger, and
   when utilizing the finger sensor for operation inputs, besides for fingerprint authentication, the conversion unit excludes detection results resulting from unintentional operations on basis of characteristic phenomena which results from the recognition of the movement and the placement of the finger, which is detected when the finger touches the finger sensor unintentionally, wherein
   as to prevent erroneous recognitions from being detected in the finger sensor as the recognition of the movement and the placement of the finger, the conversion unit measures not an amount of time from the recognition of the finger release to the recognition of the finger placement but the amount of time from the recognition of the finger placement to a next recognition of the finger placement.

2. The portable terminal according to claim 1, wherein even when the finger sensor has recognized the movement of the finger indicating that the finger has been placed on the finger sensor, the conversion unit does not convert the movement of the finger into the input event until the predetermined amount of time elapses since the recognition of the placement of the finger on the finger sensor.

3. The portable terminal according to claim 1, wherein when a difference in an amount of the movement of the finger recognized by the finger sensor is greater than a predetermined value, the conversion unit discontinues a process of converting the movement of the finger recognized by the finger sensor into the input event.

4. The portable terminal according to claim 1, wherein when the finger sensor has recognized an inversion of a moving direction of the finger a plurality of times, the conversion unit discontinues a process of converting the movement of the finger recognized by the finger sensor into the input event,
wherein the conversion unit discontinues, when a notification impossibility flag is OFF, by calculating an angle of a line segment connecting coordinates indicated by a coordinate event and an origin with respect to an X axis, after comparing the calculated angle of the line segment with an angle calculated on the basis of the coordinates notified previously, determining whether the calculated angle of the line segment has changed by $180\pm\alpha°$, and the change of the calculated angle of the line segment by $180\pm\alpha°$ has occurred predetermined consecutive times, and if these conditions are satisfied, considering detection of such an incident as the detection of an operation not intended by a user so as to turn ON the notification impossibility flag.

5. The portable terminal according to claim 1, wherein when the finger sensor has recognized the movement of the finger in a vertical direction a plurality of times, the conversion unit discontinues a process of converting the movement of the finger recognized by the finger sensor into the input event.

6. The portable terminal according to claim 1, wherein the finger sensor is positioned on a rear side with respect to a front side where a display of the portable terminal is present.

7. The portable terminal according to claim 1, wherein the finger sensor is positioned on a side on which an index finger lies when a user sees a display of the portable terminal while holding the display with one hand.

8. An input control method comprising:
recognizing a movement of a finger by a finger sensor; and
converting the movement of the finger recognized at the recognizing into an input event corresponding to an operation instruction to an application running on a portable terminal comprising, wherein
at the converting, if a period of time from recognition of release of the finger from the finger sensor to recognition of placement of the finger on the finger sensor is less than a predetermined amount of time, then a conversion unit does not convert to the input event the recognition of the placement of the finger and the recognition of the movement of the finger until the recognition of the release of the finger after the recognition of the placement of the finger, and
at the converting, when utilizing the finger sensor for operation inputs, besides for fingerprint authentication, the conversion unit excludes detection results resulting from unintentional operations on basis of characteristic phenomena which results from the recognition of the movement and the placement of the finger, which is detected when the finger touches the finger sensor unintentionally, wherein
so as to prevent erroneous recognitions from being detected in the finger sensor as the recognition of the movement and the placement of the finger, the conversion unit measures not an amount of time from the recognition of the finger release to the recognition of the finger placement but the amount of time from the recognition of the finger placement to a next recognition of the finger placement.

9. The input control method according to claim 8, wherein at the converting, even when the finger sensor has recognized the movement of the finger indicating that the finger has been placed on the finger sensor, the movement of the finger is not converted into the input event until the predetermined amount of time elapses since the recognition of the placement of the finger on the finger sensor.

10. The input control method according to claim 8, wherein the converting further comprises discontinuing, when a difference in an amount of the movement of the finger recognized by the finger sensor is greater than a predetermined value, a process of converting the movement of the finger recognized by the finger sensor into the input event.

11. The input method according to claim 8, wherein the converting further comprises discontinuing, when the finger sensor has recognized an inversion of a moving direction of the finger a plurality of times, a process of converting the movement of the finger recognized by the finger sensor into the input event.

12. The input method according to claim 8, wherein the converting further comprises discontinuing, when the finger sensor has recognized the movement of the finger in a vertical direction a plurality of times, a process of converting the movement of the finger recognized by the finger sensor into the input event.

* * * * *